(12) United States Patent
Jeong et al.

(10) Patent No.: US 12,545,080 B2
(45) Date of Patent: Feb. 10, 2026

(54) HEAT PUMP SYSTEM FOR A VEHICLE

(71) Applicants: HYUNDAI MOTOR COMPANY, Seoul (KR); KIA CORPORATION, Seoul (KR); DOOWON CLIMATE CONTROL CO., LTD., Asan-si (KR)

(72) Inventors: Hoyoung Jeong, Hwaseong-si (KR); Hochan An, Hwaseong-si (KR); Yeonho Kim, Seoul (KR); Jeawan Kim, Hwaseong-si (KR); Gwi Taek Kim, Cheonan-si (KR); Yeong Jun Kim, Incheon (KR); Jae Yeon Kim, Hwaseong-si (KR); Man Hee Park, Suwon-si (KR); Chul Min Kim, Asan-si (KR); Daehui Lee, Hwaseong-si (KR); Seong Wan Jeong, Cheongju-si (KR); Mingyu Lee, Asan-si (KR)

(73) Assignees: HYUNDAI MOTOR COMPANY, Seoul (KR); KIA CORPORATION, Seoul (KR); DOOWON CLIMATE CONTROL CO., LTD., Asan-si (KR)

(*) Notice: Subject to any disclaimer, the term of this patent is extended or adjusted under 35 U.S.C. 154(b) by 178 days.

(21) Appl. No.: 18/408,290

(22) Filed: Jan. 9, 2024

(65) Prior Publication Data
US 2025/0058603 A1 Feb. 20, 2025

(30) Foreign Application Priority Data
Aug. 17, 2023 (KR) ............ 10-2023-0107848

(51) Int. Cl.
*B60H 1/00* (2006.01)
*F25B 30/02* (2006.01)
*F25B 41/31* (2021.01)

(52) U.S. Cl.
CPC ...... *B60H 1/00899* (2013.01); *B60H 1/00278* (2013.01); *F25B 30/02* (2013.01); *F25B 41/31* (2021.01)

(58) Field of Classification Search
CPC ............ B60H 1/00899; B60H 1/00278; B60H 2001/3285; B60H 1/143; B60H 2001/00949; B60H 2001/00957; B60H 2001/00928; B60H 1/00907; B60H 1/00921; B60H 1/32284; B60H 1/00499; B60H 1/00878; B60H 1/00885; F25B 30/02; F25B 41/31; F25B 41/20;
(Continued)

(56) References Cited

U.S. PATENT DOCUMENTS

2017/0361677 A1* 12/2017 Kim ................... H01M 10/663
2020/0122545 A1* 4/2020 Lee .......................... B60H 1/06
(Continued)

FOREIGN PATENT DOCUMENTS

CN 115675013 A * 2/2023
DE 102021117580 A1 * 3/2022 ......... B60H 1/00899
(Continued)

*Primary Examiner* — Kun Kai Ma
(74) *Attorney, Agent, or Firm* — Lempia Summerfield Katz LLC

(57) ABSTRACT

A heat pump system for a vehicle cools or heats the vehicle interior by using a natural refrigerant, and efficiently adjusts the temperature of a battery module by using a single chiller that exchanges heat between refrigerant and coolant.

23 Claims, 10 Drawing Sheets

(58) Field of Classification Search
CPC .......... F25B 9/008; F25B 49/02; B60K 11/02; B60L 58/24; B60Y 2200/91
See application file for complete search history.

(56) References Cited

U.S. PATENT DOCUMENTS

| | | | |
|---|---|---|---|
| 2022/0048359 A1* | 2/2022 | Kim | B60H 1/143 |
| 2022/0088990 A1* | 3/2022 | Kim | B60H 1/32284 |
| 2022/0088991 A1* | 3/2022 | Kim | B60H 1/03 |
| 2022/0266651 A1* | 8/2022 | Jeong | B60H 1/2221 |
| 2022/0274463 A1* | 9/2022 | Koo | B60H 1/00885 |
| 2022/0324294 A1* | 10/2022 | Kim | B60H 1/00921 |
| 2022/0355639 A1* | 11/2022 | Kim | B60H 1/00814 |
| 2022/0355648 A1* | 11/2022 | Kim | B60H 1/143 |
| 2022/0379681 A1* | 12/2022 | Kim | B60H 1/00485 |
| 2022/0410661 A1* | 12/2022 | Lee | B60H 1/00278 |
| 2023/0040535 A1* | 2/2023 | Song | B60H 1/3211 |
| 2023/0158860 A1* | 5/2023 | Kim | B60K 11/02 62/115 |
| 2023/0173883 A1* | 6/2023 | Jeong | B60H 3/024 |

FOREIGN PATENT DOCUMENTS

| | | | | |
|---|---|---|---|---|
| DE | 102020130196 A1 | * | 5/2022 | ................ F25B 6/04 |
| DE | 102022126583 A1 | * | 6/2023 | ........ H01M 10/6569 |
| KR | 20180093184 A | * | 8/2018 | ........ B60H 1/00921 |
| KR | 20220147207 A | * | 11/2022 | ........... B60H 1/3214 |
| KR | 20220156240 A | * | 11/2022 | ........ B60H 1/00899 |
| KR | 20230014903 A | * | 1/2023 | ............. F25B 40/06 |
| KR | 20230039208 A | * | 3/2023 | ........... B60H 1/3213 |
| KR | 20230052397 A | * | 4/2023 | ........ B60H 1/00899 |
| KR | 20230086357 A | * | 6/2023 | .............. B60L 53/11 |
| KR | 20230097745 A | * | 7/2023 | ........ B60H 1/00885 |
| KR | 20230103867 A | * | 7/2023 | ........ B60H 1/00885 |

* cited by examiner

HEAT PUMP SYSTEM FOR A VEHICLE

CROSS-REFERENCE TO RELATED APPLICATION

This application claims priority to and the benefit of Korean Patent Application No. 10-2023-0107848 filed in the Korean Intellectual Property Office on Aug. 17, 2023, the entire contents of which are incorporated herein by reference.

BACKGROUND

(a) Field of the Disclosure

The present disclosure relates to a heat pump system for a vehicle. More particularly, the present disclosure relates to a heat pump system for a vehicle capable of performing cooling or heating of a vehicle interior by using natural refrigerant, and efficiently adjusting the temperature of a battery module by using a single chiller where refrigerant and coolant exchange heat.

(b) Description of the Related Art

Generally, an air conditioning system for a vehicle includes an air conditioner unit circulating a refrigerant in order to heat or cool an interior of the vehicle.

The air conditioner unit, which is used to maintain the interior of the vehicle at an appropriate temperature regardless of a change in an external temperature, is configured to heat or cool the interior of the vehicle. This is achieved by heat-exchange using a condenser and an evaporator in a process in which a refrigerant discharged by driving of a compressor is circulated back to the compressor through the condenser, a receiver drier, an expansion valve, and the evaporator.

In other words, the air conditioner unit lowers the temperature and humidity of the interior of the vehicle by condensing a high-temperature high-pressure gas-phase refrigerant compressed from the compressor by the condenser, passing the refrigerant through the receiver drier and the expansion valve, and then evaporating the refrigerant in the evaporator in a cooling mode.

The development of an environment-friendly technology of a vehicle may be a core technology in the future of the automobile industry. Advanced car makers have focused their energy on the development of an environmentally-friendly vehicle to achieve environmental and fuel efficiency regulations.

Recently, in accordance with a continuous increase in interest in energy efficiency and environmental pollution problems, the development of an environmentally-friendly vehicle capable of substantially substituting for an internal combustion engine vehicle is required. The environmentally-friendly vehicle is classified into an electric vehicle driven using a fuel cell or electricity as a power source and a hybrid vehicle driven using an engine and a battery.

Currently, the electric vehicle is in the spotlight as a means of transportation in the future that could solve environmental problems and energy resource problems.

A heat pump system, which is an air conditioner apparatus for regulating the temperature of the vehicle interior, is applied to such an electric vehicle.

However, the refrigerant that is conventionally used in the heat pump system contains a large amount of environmentally regulated material, e.g., PFAS (Per- and Polyfluoroalkyl Substances). Therefore, there is a demand for the development of a system capable of controlling the temperature of the vehicle interior by using new refrigerants without PFAS and flammability, or natural refrigerants.

The above information disclosed in this Background section is provided only to enhance understanding of the background of the disclosure. Therefore, the Background section may contain information that does not form the prior art that is already known in this country to a person of ordinary skill in the art.

SUMMARY

The present disclosure attempts to provide a heat pump system for a vehicle capable of performing cooling or heating of a vehicle interior by using natural refrigerant. Additionally, the present disclosure attempts to provide a heat pump system for a vehicle capable of efficiently adjusting the temperature of a battery module by using a single chiller where refrigerant and coolant exchange heat, to respond to environmental regulations.

In addition, the heat pump system may be capable of maximizing cooling and heating performance by operating in a super-critical cycle that is a state in which the pressure and temperature of the refrigerant are higher than the threshold pressure and temperature by applying an R744 refrigerant. The R744 refrigerant is a natural refrigerant using carbon dioxide.

A heat pump system for a vehicle may include an air conditioner unit having a compressor, a first heat-exchanger, a second heat-exchanger, a third heat-exchanger, and a fourth heat-exchanger that are connected through a refrigerant line so as to circulate the refrigerant through a refrigerant line. The heat pump system may also have a chiller configured to exchange heat between the refrigerant supplied from the air conditioner unit with a coolant to adjust a temperature of the coolant. The air conditioner unit may further include a first control apparatus provided in the refrigerant line between the first heat-exchanger and the second heat-exchanger and configured to selectively supply the refrigerant having passed through the first heat-exchanger to the second heat-exchanger or the fourth heat-exchanger. The air conditioner unit may also include a second control apparatus provided in the refrigerant line between the third heat-exchanger and the fourth heat-exchanger and configured to selectively expand the refrigerant. The air conditioner may also include a first connection line having a first end connected to the second control apparatus and a second end connected to the refrigerant line between the fourth heat-exchanger and the compressor and provided with the chiller. The air conditioner may also include a second connection line having a first end connected to the first control apparatus and a second end connected to the refrigerant line between the fourth heat-exchanger and the compressor. The air conditioner may also include a third control apparatus provided in the refrigerant line between the fourth heat-exchanger and the compressor. The air conditioner may also include a third connection line having a first end connected to the third control apparatus, and a second end connected to the refrigerant line between the first control apparatus and the second heat-exchanger.

The first control apparatus may include a first valve provided in the refrigerant line between the first heat-exchanger and the second heat-exchanger, and a second valve provided in the second connection line.

The first valve and the second valve may be 2-way valves.

The first control apparatus may include a single first control valve provided in a portion where the refrigerant line and the second connection line are connected between the first heat-exchanger and the second heat-exchanger.

The second control apparatus may include a first expansion valve provided in the refrigerant line upstream of the fourth heat-exchanger. The second control apparatus may also include a second expansion valve provided in the first connection line upstream of the chiller.

The third control apparatus may include a third valve provided in the refrigerant line between the fourth heat-exchanger and the compressor and may include a fourth valve provided in the third connection line.

The third control apparatus may include a single second control valve provided in a portion where the refrigerant line and the third connection line are connected between the fourth heat-exchanger and the compressor.

The air conditioner unit may further include a fourth connection line having a first end connected to the refrigerant line between the first control apparatus and the second heat-exchanger and a second end connected to the refrigerant line between the second heat-exchanger and the third heat-exchanger. The air conditioner unit may also include a fourth control apparatus provided in the fourth connection line and configured to selectively open and close the fourth connection line. The air conditioner unit may also include a fifth control apparatus provided in the refrigerant line between the second heat-exchanger and the third heat-exchanger. Additionally, the air conditioner unit may include a fifth connection line having a first end connected to the fifth control apparatus and a second end connected to the refrigerant line between the third heat-exchanger and the fourth heat-exchanger.

The fourth control apparatus may be a 2-way valve.

The fifth control apparatus may include a fifth valve provided in the refrigerant line between the second heat-exchanger and the third heat-exchanger and may include a sixth valve provided in the fifth connection line.

The fifth control apparatus may include a single third control valve provided in a portion where the refrigerant line and the fifth connection line are connected between the second heat-exchanger and the third heat-exchanger.

In a cooling mode of the vehicle interior, the refrigerant line connecting the first heat-exchanger and the second heat-exchanger may be opened by an operation of the first control apparatus. The refrigerant line connecting the second heat-exchanger and the third heat-exchanger may also be opened by an operation of the fifth control apparatus. The refrigerant line connecting the fourth heat-exchanger and the compressor may also be opened by an operation of the third control apparatus. The second connection line may also be closed by the operation of the first control apparatus. The third connection line may also be closed by the operation of the third control apparatus. The fourth connection line may also be closed by an operation of the fourth control apparatus. The fifth connection line may also be closed by the operation of the fifth control apparatus.

In the cooling mode of the vehicle interior, when cooling of a battery module is required, the first connection line may be opened by an operation of the second control apparatus.

The second control apparatus may be configured to expand the refrigerant introduced into the first connection line and flow the expanded refrigerant to the chiller such that the battery module may be cooled by using the coolant having exchanged heat with the refrigerant in the chiller.

The second control apparatus may be configured to expand the refrigerant introduced into the fourth heat-exchanger such that the expanded refrigerant may be introduced into the fourth heat-exchanger.

In a heating mode of the vehicle interior, a portion of the refrigerant line connecting the first heat-exchanger and the second heat-exchanger may be closed by an operation of the first control apparatus. The first connection line may also be closed by an operation of the second control apparatus. The second connection line may also be opened by the operation of the first control apparatus. A portion of the refrigerant line connecting the fourth heat-exchanger and the third control apparatus may also be closed by an operation of the third control apparatus. The third connection line may also be opened by the operation of the third control apparatus. The fourth connection line may also be opened by an operation of the fourth control apparatus. The fifth connection line may also be opened by an operation of the fifth control apparatus. A portion of the refrigerant line connecting the third heat-exchanger and the fifth control apparatus may also be closed by the operation of the fifth control apparatus.

The second control apparatus may be configured to expand the refrigerant introduced from the fourth heat-exchanger and flow the expanded refrigerant to the refrigerant line.

A portion of the refrigerant among the refrigerant introduced from the second control apparatus into the refrigerant line may be introduced into the second heat-exchanger through the fifth connection line. A remaining portion of the refrigerant among the refrigerant introduced from the second control apparatus into the refrigerant line may be introduced into the third heat-exchanger along the refrigerant line. The refrigerant having passed through the third heat-exchanger may flow along the opened fourth connection line.

The refrigerant discharged from the second heat-exchanger and the third heat-exchanger may be supplied to the compressor along the opened third connection line and the refrigerant line connecting the third control apparatus and the compressor.

The second heat-exchanger, the third heat-exchanger, and the fourth heat-exchanger may be configured to cool or evaporate the refrigerant according to a selective operation of the second control apparatus.

The refrigerant may be R744 refrigerant formed of carbon dioxide.

An accumulator may be provided in the refrigerant line between the fourth heat-exchanger and the compressor. The first heat-exchanger, the third heat-exchanger, and the fourth heat-exchanger may be air-cooled gas coolers configured to exchange heat between the refrigerant with air. The second heat-exchanger and the chiller may be water-cooled gas coolers configured to exchange heat between the refrigerant with the coolant.

The second heat-exchanger may be connected to an electrical component through a first line through which the coolant circulates and the chiller may be connected to a battery module through a second line through which the coolant circulates.

As described above, by employing a heat pump system for a vehicle according to an embodiment, as cooling or heating of the vehicle interior is performed by using the natural refrigerant, it is possible to cope with environmental regulations and improve the overall marketability of the vehicle.

In addition, according to the disclosure, by applying the R744 refrigerant that is a natural refrigerant using carbon dioxide, cooling and heating performance may be maximized by being operated in a super-critical region. The super-critical region is a state in which the pressure and temperature of the refrigerant are higher than the threshold pressure and temperature, for cooling and heating of the vehicle interior.

In addition, according to the disclosure, streamlining and simplification of the system may be achieved by efficiently adjusting the temperature of the battery module by using the single chiller that exchanges heat between the coolant and the refrigerant according to the mode of the vehicle.

In addition, according to an embodiment, by efficiently adjusting the temperature of the battery module, the optimal performance of the battery module may be enabled and the overall travel distance of the vehicle may be increased due to the efficient management of the battery module.

In addition, according to the disclosure, in the heating mode of the vehicle interior, as the refrigerant is expanded and branched to be supplied to respective heat-exchangers, the flow of the refrigerant may be easily controlled, the ambient air heat and the waste heat of the electrical component may be smoothly recollected, and at the same time, the chiller for cooling the battery module may be optimally designed.

In addition, according to an embodiment, it is possible to reduce manufacturing cost and weight through simplification of an entire system, and to improve space utilization.

DETAILED DESCRIPTION

Figure 1:
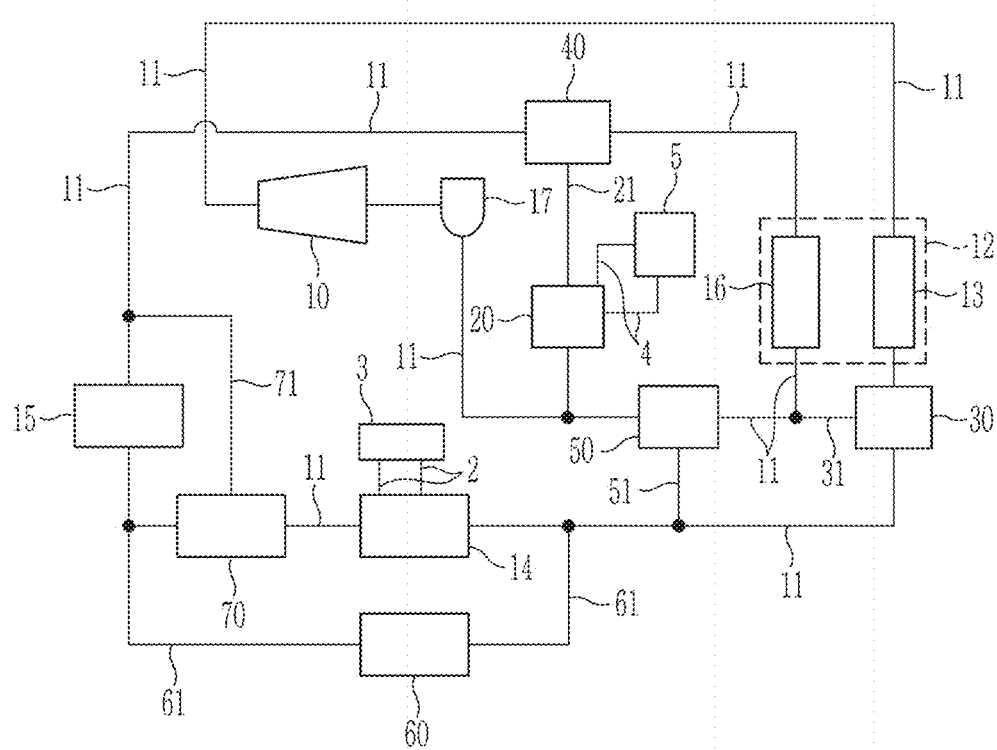
FIG. 1 is a block diagram of a heat pump system for a vehicle according to an embodiment.

Embodiments are hereinafter described in detail with reference to the accompanying drawings.

Embodiments disclosed in the present specification and the constructions depicted in the drawings are only some of the embodiments of the present disclosure, and do not cover the entire scope of the present disclosure. Therefore, it should be understood that there may be various equivalents and variations at the time of the application of this specification.

In order to clarify the present disclosure, parts that are not related to the description have been omitted, and the same elements or equivalents have been referred to with the same reference numerals throughout the specification.

Also, the size and thickness of each element are arbitrarily shown in the drawings, but the present disclosure is not necessarily limited thereto. Additionally, in the drawings, the thickness of layers, films, panels, regions, and the like, are exaggerated for clarity.

In addition, unless explicitly described to the contrary, the terms "comprise" and variations such as "comprises" or "comprising", should be understood to imply the inclusion of stated elements but not the exclusion of any other elements.

When a component, device, element, or the like of the present disclosure is described as having a purpose or performing an operation, function, or the like, the component, device, or element should be considered herein as being "configured to" meet that purpose or perform that operation or function.

Figure 2:
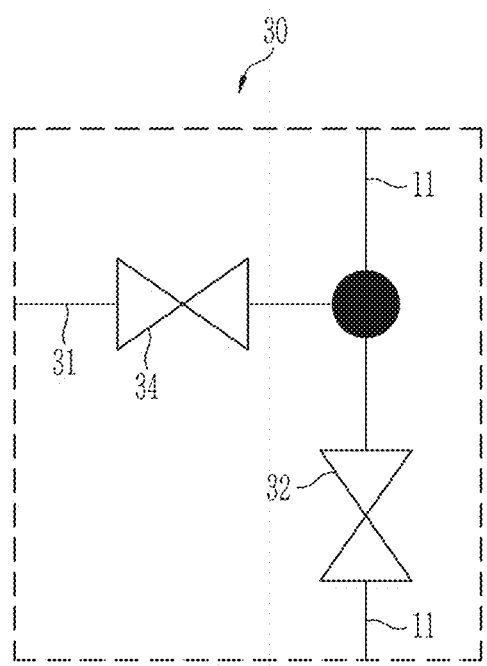
FIG. 2 is a schematic diagram of a first control apparatus of a heat pump system for a vehicle according to an embodiment.
Figure 3:
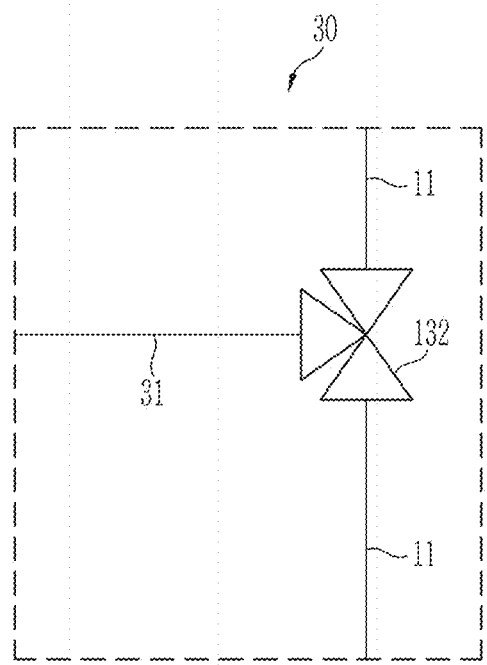
FIG. 3 is a schematic diagram of another embodiment of a first control apparatus of a heat pump system for a vehicle according to an embodiment.
Figure 4:
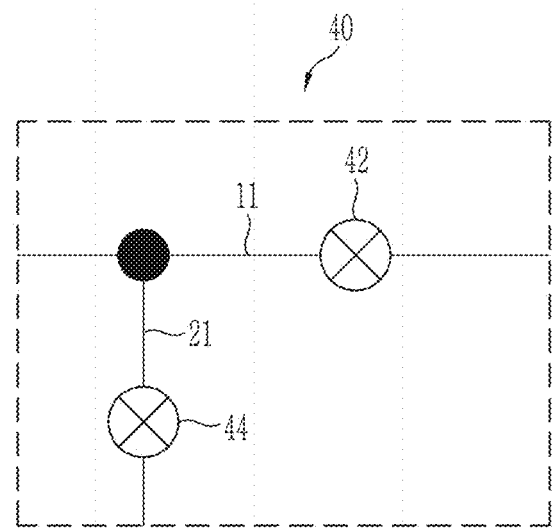
FIG. 4 is a schematic diagram of a second control apparatus of a heat pump system for a vehicle according to an embodiment.
Figure 5:
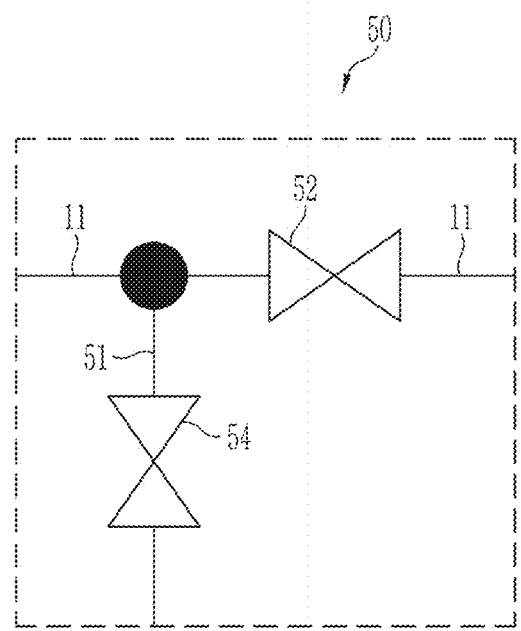
FIG. 5 is a schematic diagram of a third control apparatus of a heat pump system for a vehicle according to an embodiment.
Figure 6:
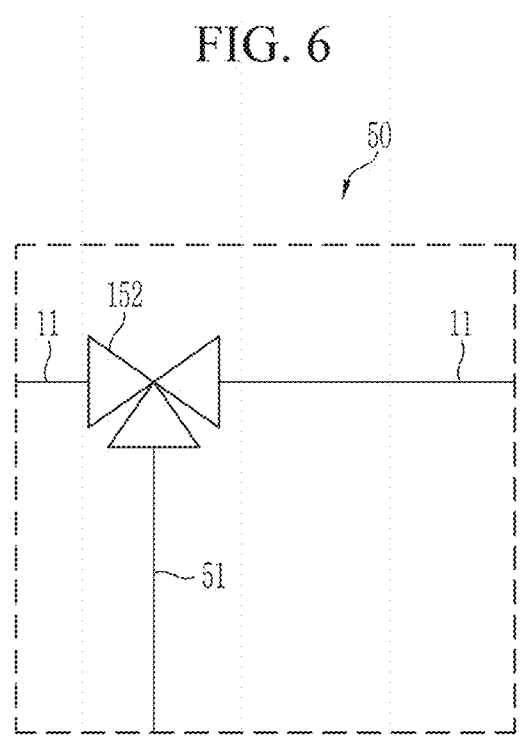
FIG. 6 is a schematic diagram of another embodiment of a third control apparatus of a heat pump system for a vehicle according to an embodiment.
Figure 7:
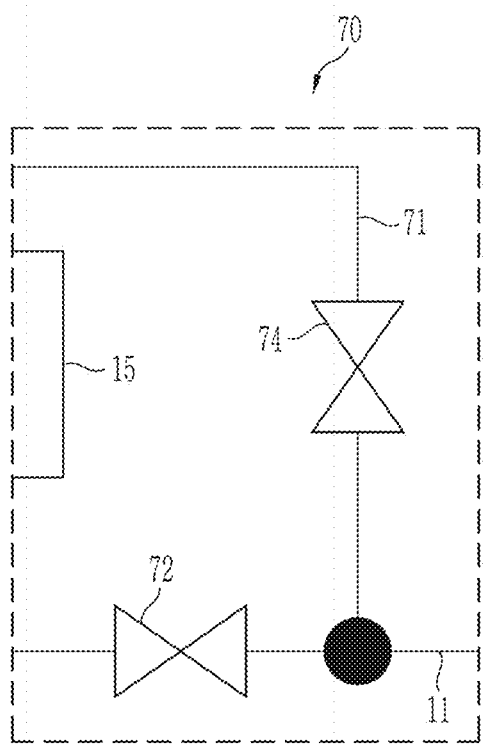
FIG. 7 is a schematic diagram of a fifth control apparatus of a heat pump system for a vehicle according to an embodiment.
Figure 8:
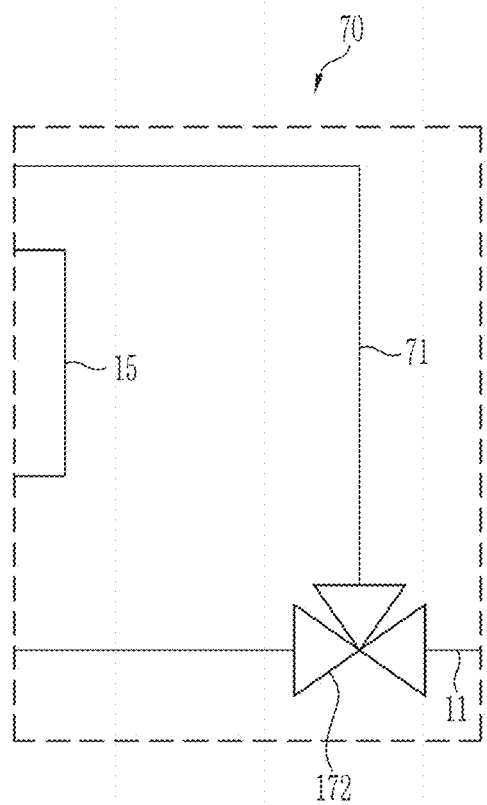
FIG. 8 is a schematic diagram of another embodiment of a fifth control apparatus of a heat pump system for a vehicle according to an embodiment.

FIG. 1 is a block diagram of a heat pump system for a vehicle according to an embodiment. FIG. 2 is a schematic diagram of a first control apparatus of a heat pump system for a vehicle according to an embodiment. FIG. 3 is a schematic diagram of another embodiment of a first control apparatus of a heat pump system for a vehicle according to an embodiment. FIG. 4 is a schematic diagram of a second control apparatus of a heat pump system for a vehicle according to an embodiment. FIG. 5 is a schematic diagram of a third control apparatus of a heat pump system for a vehicle according to an embodiment. FIG. 6 is a schematic diagram of another embodiment of a third control apparatus of a heat pump system for a vehicle according to an embodiment. FIG. 7 is a schematic diagram of a fifth control apparatus of a heat pump system for a vehicle according to an embodiment. FIG. 8 is a schematic diagram of another embodiment of a fifth control apparatus of a heat pump system for a vehicle according to an embodiment.

A heat pump system for a vehicle according to an embodiment may perform cooling or heating of a vehicle interior by using natural refrigerant and efficiently adjusting the temperature of a battery module 5. The temperature of the battery module 5 is adjusted by using a single chiller 20 that exchanges heat between the refrigerant and coolant, so as to respond to environmental regulations.

The refrigerant may be an R744 refrigerant formed of carbon dioxide, of which the ozone depletion potential (ODP) is 0 and the global warming potential (GWP) is 1.

In other words, by applying the R744 refrigerant that is a natural refrigerant using carbon dioxide, a heat pump system for a vehicle according to an embodiment may maximize cooling and heating performance, by being operated in a super-critical cycle. A super-critical cycle is a state in which the pressure and temperature of the refrigerant are higher than the threshold pressure and temperature.

For such a purpose, the heat pump system according to an embodiment may include an air conditioner unit and the chiller 20.

Referring to FIG. 1, the air conditioner unit includes a compressor 10, a first heat-exchanger 13, a second heat-exchanger 14, a third heat-exchanger 15, and a fourth heat-exchanger 16. The air conditioner unit also includes a first connection line 21, a first control apparatus 30, a second connection line 31, a second control apparatus 40, a third connection line 51, and a third control apparatus 50. All of the components of the air conditioner are connected through a refrigerant line 11 so as to circulate the refrigerant through a refrigerant line 11.

First, the compressor 10 may compress and flow the refrigerant to the refrigerant line 11, such that the refrigerant may circulate through the refrigerant line 11.

The first heat-exchanger 13 may heat-exchange the refrigerant selectively supplied from the compressor 10 with air.

The second heat-exchanger 14 may be connected to the first heat-exchanger 13 through the refrigerant line 11. Accordingly, the refrigerant supplied to the refrigerant line 11 may pass through the second heat-exchanger 14.

The second heat-exchanger 14 may be connected to an electrical component 3 through a first line 2 through which the coolant circulates.

The electrical component 3 may include a power conversion device such as an electric power control unit (EPCU), a motor, an inverter, an on-board charger (OBC), an autonomous driving controller, or the like.

The electrical component 3 configured as such may be water-cooled by being connected to the first line 2.

In the present embodiment, the third heat-exchanger 15 may be connected to the second heat-exchanger 14 through the refrigerant line 11. The third heat-exchanger 15 is disposed at a frontal side (i.e., a front side) of the vehicle and may cool or evaporate the refrigerant through heat-exchange with the air introduced from the outside when the vehicle is running.

Since the R744 refrigerant is a super-critical refrigerant and, unlike typical refrigerants, undergoes no phase change, it is described as a gas cooling refrigerant rather than a condensing refrigerant.

In addition, the second heat-exchanger 14 may cool or evaporate the refrigerant through heat-exchange with the coolant supplied through the first line 2. The second heat-exchanger 14 may be a water-cooled gas cooler that heat-exchanges the interiorly introduced refrigerant with the coolant.

In the present embodiment, the fourth heat-exchanger 16 may be provided in the refrigerant line 11 between the third heat-exchanger 15 and the compressor 10.

The first heat-exchanger 13, the third heat-exchanger 15, and the fourth heat-exchanger 16 configured as such may be an air-cooled gas cooler that heat-exchanges the interiorly introduced refrigerant with the air.

The first heat-exchanger 13 and the fourth heat-exchanger 16 may be provided inside a HVAC module (heating, ventilation, and air conditioning module) 12.

Between the first heat-exchanger 13 and the fourth heat-exchanger 16, an opening/closing door (not shown) may be provided inside the HVAC module 12 such that the air having passed through the fourth heat-exchanger 16 may be selectively introduced into the first heat-exchanger 13.

In the heating mode of the vehicle interior, the opening/closing door is opened such that the air having passed through the fourth heat-exchanger 16 may be introduced into the first heat-exchanger 13.

To the contrary, in the cooling mode of the vehicle interior, the opening/closing door closes a side (not shown) toward the first heat-exchanger 13 such that the air cooled while passing through the fourth heat-exchanger 16 may be directly introduced into the vehicle interior.

In the present embodiment, an accumulator 17 may be provided in the refrigerant line 11 between the fourth heat-exchanger 16 and the compressor 10.

The accumulator 17 only supplies gaseous refrigerant to the compressor 10, thereby improving the efficiency and durability of the compressor 10.

In addition, although not shown in the drawings, an inner heat-exchanger may be provided inside the accumulator 17.

The inner heat-exchanger may heat-exchange the refrigerant cooled in the third heat-exchanger 15 with the low-temperature refrigerant discharged from the fourth heat-exchanger 16 and may supply the heat-exchanged refrigerant to the compressor 10 and the fourth heat-exchanger 16, respectively.

In the present embodiment, the chiller 20 may be connected to the battery module 5 through a second line 4 through which the coolant circulates. Accordingly, the coolant may be selectively circulated through the chiller 20.

The chiller 20 may heat-exchange the refrigerant supplied from the air conditioner unit with the coolant, and thereby adjust the temperature of the coolant. In other words, the chiller 20 may be a water-cooled gas cooler that heat-exchanges the interiorly introduced refrigerant with the coolant.

The chiller 20 may be connected to the refrigerant line 11 through the first connection line 21.

In the present embodiment, the first control apparatus 30 may be provided in the refrigerant line 11 between the first heat-exchanger 13 and the second heat-exchanger 14 such that the refrigerant having passed through the first heat-exchanger 13 may be selectively supplied to the second heat-exchanger 14 or the fourth heat-exchanger 16.

The second control apparatus 40 may be provided in the refrigerant line 11, between the third heat-exchanger 15 and the fourth heat-exchanger 16. The second control apparatus 40 may selectively expand the introduced refrigerant.

A first end of the first connection line 21 is connected to the second control apparatus 40. A second end of the first connection line 21 is connected to the refrigerant line 11 between the fourth heat-exchanger 16 and the compressor 10.

The chiller 20 configured as such may be provided in the first connection line 21. In other words, the chiller 20 may be connected to the second control apparatus 40 through the first connection line 21.

In the present embodiment, a first end of the second connection line 31 is connected to the first control apparatus 30. A second end of the second connection line 31 may be connected to the refrigerant line 11 between the fourth heat-exchanger 16 and the compressor 10.

As shown in FIG. 2, the first control apparatus 30 may include a first valve and a second valve 34.

First, the first valve 32 is provided in the refrigerant line 11 between the first heat-exchanger 13 and the second heat-exchanger 14.

In addition, the second valve 34 may be provided in the second connection line 31.

The first valve 32 and the second valve 34 configured as such may be a 2-way valve that controls the opening and closing of the refrigerant line 11 and the second connection line 31.

In the cooling mode of the vehicle interior, the first control apparatus 30 may flow, the refrigerant supplied from the first heat-exchanger 13 to the second heat-exchanger 14.

On the other hand, in the heating mode of the vehicle interior, the first control apparatus 30 may supply the refrigerant introduced through the refrigerant line 11 to the fourth heat-exchanger 16 through the second connection line 31.

In the present embodiment, the first control apparatus 30 is configured with two 2-way valves, but it is not limited thereto. A first control apparatus 30 according to another embodiment is described below with reference to FIG. 3.

Referring to FIG. 3, the first control apparatus 30 according to another embodiment may include a first control valve 132 provided in a portion where the refrigerant line 11 and the second connection line 31 are connected between the first heat-exchanger 13 and the second heat-exchanger 14.

The first control valve 132 may selectively connect the refrigerant line 11 and the second connection line 31, and at the same time, may control the flow direction and flow amount of the refrigerant.

In other words, the first control apparatus 30 according to another embodiment is applied with the first control valve 132 configured with a 3-way valve. This embodiment of the first control apparatus 30 may not only reduce the number of valves but also perform the same operation as the above-mentioned embodiment.

In the present embodiment, the upstream of the fourth heat-exchanger 16, the downstream of the fourth heat-exchanger 16, the upstream of the chiller 20, and the downstream of the chiller 20 may be set based on the flow direction of the refrigerant.

In the cooling mode of the vehicle interior (see FIG. 9), based on the direction in which the refrigerant flows along the refrigerant line 11, the position at which the refrigerant is introduced into the fourth heat-exchanger 16 may be defined as upstream of the fourth heat-exchanger 16. Also, the position at which the refrigerant is discharged from the fourth heat-exchanger 16 may be defined as downstream of the fourth heat-exchanger 16.

In addition, based on the direction in which the refrigerant flows along the first connection line 21, the position at which the refrigerant is introduced into the chiller 20 may be defined as upstream of the chiller 20. Also, the position at which the refrigerant is discharged from the chiller 20 may be defined as downstream of the chiller 20.

In the present embodiment, as shown in FIG. 4, the second control apparatus 40 may include a first expansion valve 42 and a second expansion valve 44.

First, the first expansion valve 42 is provided in the refrigerant line 11, upstream of the fourth heat-exchanger 16. In addition, the second expansion valve 44 is provided in the first connection line 21, upstream of the chiller 20.

The second control apparatus 40 configured as such may selectively expand the refrigerant introduced through the refrigerant line 11.

In addition, the second control apparatus 40 may supply the refrigerant to the fourth heat-exchanger 16, the chiller 20, or a combination thereof through the refrigerant line 11 and the first connection line 21.

In other words, the second control apparatus 40 may selectively expand the refrigerant while controlling the flow of the refrigerant.

Accordingly, the chiller 20 may heat-exchange the coolant selectively introduced through the second line 4 with the refrigerant selectively supplied from the air conditioner unit. As a result, the chiller 20 may adjust the temperature of the coolant.

The coolant heat-exchanged in the chiller 20 may circulate the battery module 5 through the second line 4.

A water pump (not shown) may be provided in the first line 2 and the second line 4.

In other words, the coolant may circulate the first line 2 and the second line 4 according to an operation of each water pump (not shown).

Accordingly, the coolant heat-exchanged with the refrigerant at the second heat-exchanger 14 and the chiller 20 may adjust the temperatures of the electrical component 3 and the battery module 5 by being selectively supplied to the electrical component 3 and the battery module 5.

Depending on the cooling mode or heating mode of the vehicle interior, the second control apparatus 40 may selectively expand the introduced refrigerant and introduce the expanded refrigerant to the chiller 20 through the first connection line 21.

In addition, the second control apparatus 40 may supply the introduced refrigerant to the chiller 20 without expansion through the first connection line 21 or close the first connection line 21 such that the refrigerant may not be supplied to the chiller 20.

In more detail, when the battery module 5 is cooled by using the coolant having heat-exchanged with the refrigerant in the chiller 20, the second control apparatus 40 may open the first connection line 21.

Simultaneously, the second control apparatus 40 may expand the introduced refrigerant. The expanded refrigerant may flow to the chiller 20 through the first connection line 21.

In other words, in the cooling mode of the vehicle interior, the second control apparatus 40 may expand the refrigerant discharged from the third heat-exchanger 15 to decrease its temperature and flow the expanded refrigerant to the chiller 20, thereby further decreasing the temperature of the coolant passing through the interior of the chiller 20.

Accordingly, the battery module 5 may be cooled more efficiently, by the flowing coolant that was cooled passing through the chiller 20.

In addition, in the cooling mode of the vehicle interior, the second control apparatus 40 may expand the introduced refrigerant and may flow the expanded refrigerant to the fourth heat-exchanger 16 through the refrigerant line 11. To the contrary, in the heating mode of the vehicle interior, the second control apparatus 40 may expand the refrigerant introduced from the fourth heat-exchanger 16 and may flow the expanded refrigerant to the second heat-exchanger 14 or the third heat-exchanger 15 through the refrigerant line 11.

In the present embodiment, the third control apparatus 50 may be provided in the refrigerant line 11, between the fourth heat-exchanger 16 and the compressor 10.

In addition, a first end of the third connection line 51 is connected to the third control apparatus 50. A second end of the third connection line 51 may be connected to the refrigerant line 11 between the first control apparatus 30 and the second heat-exchanger 14.

As shown in FIG. 5, the third control apparatus 50 may include a third valve 52 and a fourth valve 54.

First, the third valve 52 is provided in the refrigerant line 11, between the fourth heat-exchanger 16 and the compressor 10.

In addition, the fourth valve 54 may be provided in the third connection line 51. The fourth valve 54 may control the opening and closing of the third connection line 51.

The third valve 52 and the fourth valve 54 configured as such may be a 2-way valve that control the opening and closing of the refrigerant line 11 and the third connection line 51.

In the cooling mode of the vehicle interior (see FIG. 9), the third control apparatus 50 may close the third connection line 51 and open the refrigerant line connected to the accumulator 17.

To the contrary, in the heating mode of the vehicle interior (see FIG. 10), the third control apparatus 50 may close the refrigerant line 11 connected to the fourth heat-exchanger 16 and may open the third connection line 51.

In the present embodiment, the third control apparatus 50 is configured with two 2-way valves, but it is not limited thereto. A third control apparatus 50 according to another embodiment is described below with reference to FIG. 6.

Referring to FIG. 6, the third control apparatus 50 according to another embodiment may include a second control valve 152 provided in a portion where the refrigerant line 11 and the third connection line 51 are connected between the fourth heat-exchanger 16 and the compressor 10.

The second control valve 152 may selectively connect the refrigerant line and the third connection line 51, and, at the same time, may control the flow direction and flow amount of the refrigerant.

In other words, the third control apparatus 50 according to another embodiment is applied with the second control valve 152 configured with a 3-way valve. This embodiment of the third control apparatus 50 may not only reduce the number of valves but also perform the same operation as the above-mentioned embodiment.

The air conditioner unit may further include a fourth control apparatus 60, a fourth connection line 61, a fifth control apparatus 70, and a fifth connection line 71.

First, the fourth control apparatus 60 is provided in the fourth connection line 61 so as to selectively open and close the fourth connection line 61. The fourth control apparatus 60 may be a 2-way valve that controls the opening and closing of the fourth connection line 61.

In the present embodiment, a first end of the fourth connection line 61 is connected to the refrigerant line 11 between the first control apparatus 30 and the second heat-exchanger 14. A second end of the fourth connection line 61 may be connected to the refrigerant line 11 between the second heat-exchanger 14 and the third heat-exchanger 15.

The fourth control apparatus 60 configured as such may selectively open and close the fourth connection line 61, depending on the cooling mode or heating mode of the vehicle interior.

In more detail, in the cooling mode of the vehicle interior, the fourth control apparatus 60 may close the fourth connection line 61. To the contrary, in the heating mode of the vehicle interior, the fourth control apparatus 60 may open the fourth connection line 61.

In other words, in the heating mode of the vehicle interior, the fourth connection line 61 is opened through an operation of the fourth control apparatus 60 such that the refrigerant discharged from the third heat-exchanger 15 may flow.

In the present embodiment, the fifth control apparatus 70 is provided in the refrigerant line 11 between the second heat-exchanger 14 and the third heat-exchanger 15.

In addition, a first end of the fifth connection line 71 is connected to the fifth control apparatus 70. A second end of the fifth connection line 71 may be connected to the refrigerant line 11 between the third heat-exchanger 15 and the fourth heat-exchanger 16.

In more detail, the second end of the fifth connection line 71 is connected to the refrigerant line 11 between the third heat-exchanger 15 and the second control apparatus 40.

As shown in FIG. 7, the fifth control apparatus 70 may include a fifth valve 72 and a sixth valve 74.

First, the fifth valve 72 is provided in the refrigerant line 11 between the second heat-exchanger 14 and the third heat-exchanger 15.

In addition, the sixth valve 74 may be provided in the fifth connection line 71.

In other words, the fifth valve 72 and the sixth valve 74 may be a 2-way valve that controls the opening and closing of the refrigerant line 11 and the fifth connection line 71.

The fifth control apparatus 70 configured as such may selectively open and close the refrigerant line 11 and the fifth connection line 71 connected to the third heat-exchanger 15, depending on the cooling mode or heating mode of the vehicle interior.

In more detail, in the cooling mode of the vehicle interior (see FIG. 9), the fifth control apparatus 70 may close the fifth connection line 71. At the same time, the fifth control apparatus 70 may open the refrigerant line 11 connecting the second heat-exchanger 14 and the third heat-exchanger 15.

To the contrary, in the heating mode of the vehicle interior (see FIG. 10), the fifth control apparatus 70 may open the fifth connection line 71. At the same time, the fifth control apparatus 70 may close the refrigerant line 11 connected to the third heat-exchanger 15.

In the present embodiment, the fifth control apparatus 70 is configured with two 2-way valves, but it is not limited thereto. A fifth control apparatus 70 according to another embodiment is described below with reference to FIG. 8.

Referring to FIG. 8, the fifth control apparatus 70 according to another embodiment may include a third control valve 172 provided in a portion where the refrigerant line 11 and the fifth connection line 71 are connected between the second heat-exchanger 14 and the third heat-exchanger 15.

The third control valve 172 may selectively connect the refrigerant line 11 and the fifth connection line 71, and, at the same time, may control the flow direction and flow amount of the refrigerant.

In other words, the fifth control apparatus 70 according to another embodiment is applied with the third control valve 172 configured with a 3-way valve. This embodiment of the fifth control apparatus 70 may not only reduce the number of valves but also perform the same operation as the above-mentioned embodiment.

In the heat pump system configured as such, the second heat-exchanger 14, the third heat-exchanger 15, and the fourth heat-exchanger 16 may cool or evaporate the introduced refrigerant according to the selective operation of the second control apparatus 40.

In other words, the second heat-exchanger 14, the third heat-exchanger 15, and the fourth heat-exchanger 16 may evaporate the refrigerant when the expanded refrigerant is introduced and cool the refrigerant when the unexpanded refrigerant is introduced.

Hereinafter, operation and action of a heat pump system of a vehicle according to an embodiment configured as described above is described in detail with reference to FIGS. 9 and 10.

First, in the cooling mode of the vehicle interior, the operation for cooling the battery module 5 is described with reference to FIG. 9.

Figure 9:
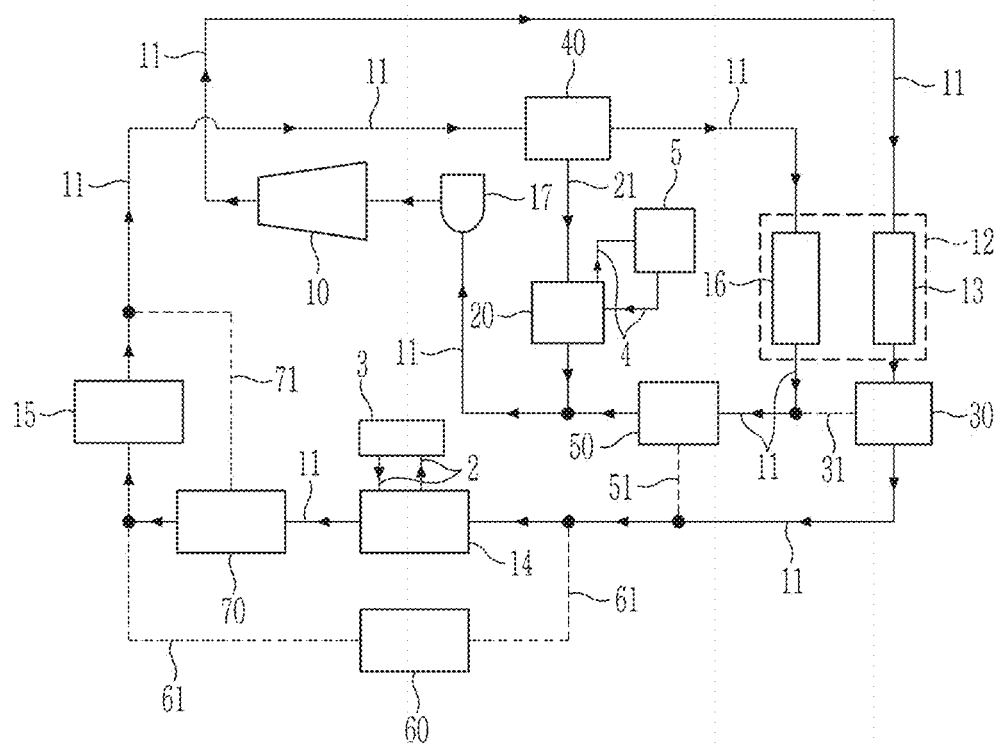
FIG. 9 is an operation diagram for cooling a battery module in a cooling mode of a vehicle interior, in a heat pump system for a vehicle according to an embodiment.

FIG. 9 is an operation diagram for cooling a battery module in a cooling mode of the vehicle interior, in a heat pump system for a vehicle according to an embodiment.

Referring to FIG. 9, the coolant may circulate through the first line 2 by an operation of a water pump (not shown).

Accordingly, the coolant having passed through the electrical component may be supplied to the second heat-exchanger 14 along the first line 2.

Respective components in the air conditioner unit operate for cooling of the vehicle interior. Accordingly, the refrigerant is circulated along the refrigerant line 11.

The refrigerant line 11 connecting the first heat-exchanger 13 and the second heat-exchanger 14 is opened by an operation of the first control apparatus 30.

The refrigerant line 11 connecting the second heat-exchanger 14 and the third heat-exchanger 15 is opened by an operation of the fifth control apparatus 70.

In addition, the refrigerant line 11 connecting the fourth heat-exchanger 16 and the compressor 10 may be opened by an operation of the third control apparatus 50.

Simultaneously, the second connection line 31 is closed by the operation of the first control apparatus 30. In addition, the third connection line 51 is closed by the operation of the third control apparatus 50.

The fourth connection line 61 is closed by the operation of the fourth control apparatus 60. In addition, the fifth connection line 71 is closed by the operation of the fifth control apparatus 70.

The first connection line 21 is opened by the operation of the second control apparatus 40, for cooling of the battery module 5.

The coolant may circulate through the second line 4 by the operation of a water pump (not shown). Accordingly, the coolant having passed through the battery module 5 may be supplied to the chiller 20 along the second line 4. The second control apparatus 40 may expand the refrigerant for cooling the battery module 5 by using the coolant having heat-exchanged with the refrigerant in the chiller 20 and may flow the expanded refrigerant to the first connection line 21. The expanded refrigerant may be introduced into the chiller 20 along the first connection line 21.

Therefore, the coolant having passed through the chiller 20 may be cooled through heat-exchange with the expanded refrigerant supplied to the chiller 20 introduced from the second control apparatus 40.

In other words, the coolant passing through the chiller 20 is cooled through heat-exchange with the expanded refrigerant supplied to the chiller 20. The coolant cooled in the chiller 20 is supplied to the battery module 5 along the second line 4. Accordingly, the battery module 5 may be efficiently cooled by the coolant cooled in the chiller 20.

The refrigerant supplied from the compressor 10 may sequentially pass through the first heat-exchanger 13, the second heat-exchanger 14, and the third heat-exchanger 15 along the refrigerant line 11.

The first heat-exchanger 13 primarily cools the refrigerant by heat-exchanging the air introduced into the HVAC module 12 with the refrigerant. The refrigerant primarily cooled at the first heat-exchanger 13 is supplied to the second heat-exchanger 14 along the refrigerant line 11.

The second heat-exchanger 14 may secondarily cool the refrigerant by using the coolant flowing along the first line 2.

In addition, the third heat-exchanger 15 may further cool the refrigerant introduced from the second heat-exchanger 14 through heat-exchange with the air.

The refrigerant having sequentially passed through the first, second, and third heat-exchangers 13, 14, and 15 may be circulated along the first connection line 21 and the opened refrigerant line 11.

The second control apparatus 40 may expand the refrigerant introduced into the fourth heat-exchanger 16 such that the expanded refrigerant may flow into the fourth heat-exchanger 16.

In other words, the second control apparatus 40 expands the refrigerant introduced into the first connection line 21 among the refrigerant having passed through the third heat-exchanger 15 such that the expanded refrigerant may be supplied to the chiller 20. Additionally, the second control apparatus 40 expands the refrigerant introduced into the refrigerant line 11 among the refrigerant having passed through the third heat-exchanger 15 such that the expanded refrigerant may be supplied to the fourth heat-exchanger 16.

Therefore, the refrigerant introduced into the first connection line 21 is expanded through the operation of the second control apparatus 40 to be in the state of low-temperature and low pressure and is introduced into the chiller 20 provided in the first connection line 21.

Then, the refrigerant introduced to the chiller 20 heat-exchanges with the coolant supplied through the second line 4, passes through the accumulator 17 along the refrigerant line 11 connected to the first connection line 21, and then flows to the compressor 10.

The remaining refrigerant discharged from the third heat-exchanger 15 flows along the refrigerant line 11 so as to cool the vehicle interior. The remaining refrigerant passes through the second control apparatus 40, the fourth heat-exchanger 16, the third control apparatus 50, the accumulator 17, and then is introduced into the compressor 10.

Air introduced into the HVAC module 12 is cooled by the refrigerant in the low-temperature state introduced into the fourth heat-exchanger 16 while passing through the fourth heat-exchanger 16.

The opening/closing door (not shown) closes a portion facing toward the first heat-exchanger 13 such that the cooled air may not pass through the first heat-exchanger 13. Therefore, the cooled air may cool the vehicle interior by being directly introduced into the vehicle interior.

The refrigerant having an increased cooled level while sequentially passing through the first, second, and the third heat-exchangers 13, 14, and 15 is expanded and supplied to the fourth heat-exchanger 16, and therefore, the refrigerant may be evaporated at a lower temperature.

In other words, in the present embodiment, the first heat-exchanger 13 and the third heat-exchanger 15 cool the refrigerant through heat-exchange with the air, and the second heat-exchanger 14 cools the refrigerant through heat-exchange with coolant, through which the R744 refrigerant formed of carbon dioxide may be more efficiently cooled. As a result, the configuration provides an advantage to the formation of sub-cooling the refrigerant.

In addition, as the refrigerant formed with sub-cooling is evaporated at a lower temperature at the fourth heat-exchanger 16, the temperature of the air passing through the fourth heat-exchanger 16 may be further decreased, thereby improving the cooling performance and efficiency.

While repeatedly performing the above-described processes, the refrigerant may cool the vehicle interior in the cooling mode of the vehicle interior and at the same time, cool the coolant through heat-exchange while passing through the chiller 20.

The low-temperature coolant cooled at the chiller 20 flows to the battery module 5 through the second line 4. Accordingly, the battery module 5 may be efficiently cooled by the supplied low-temperature coolant.

In the present embodiment, the operation in the heating mode of the vehicle interior is described with reference to FIG. 10.

Figure 10:
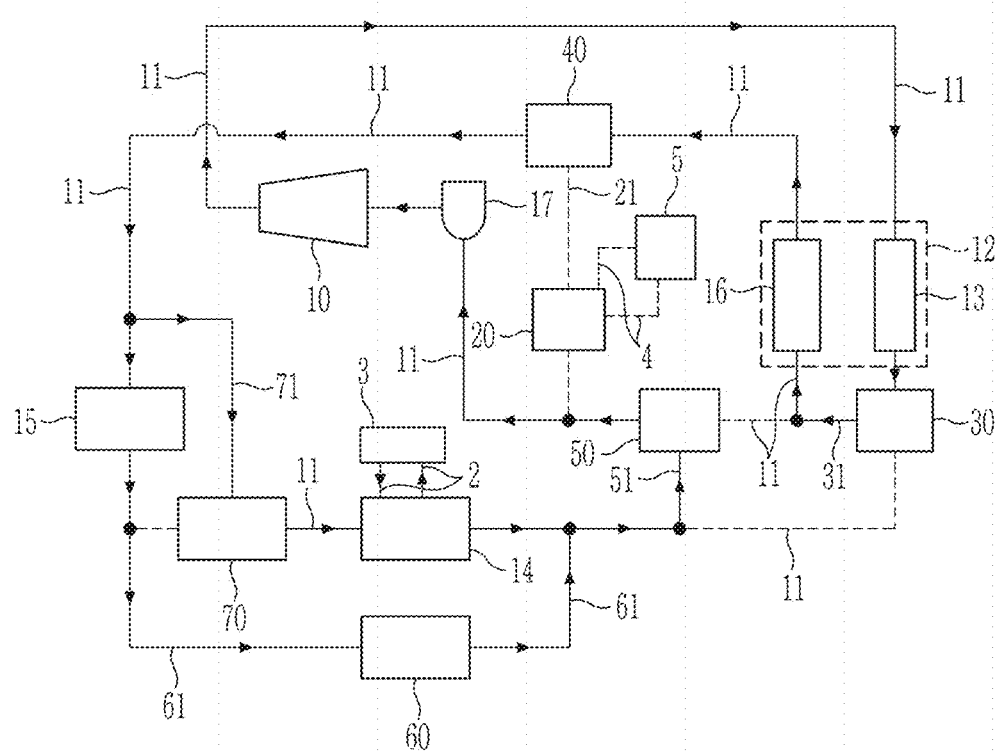
FIG. 10 is an operation diagram according to a heating mode of a vehicle interior, in a heat pump system for a vehicle according to an embodiment.

FIG. 10 is an operation diagram of a heat pump system for a vehicle according to an embodiment according to a heating mode of the vehicle interior.

Referring to FIG. 10, the coolant may circulate through the first line 2 by the operation of a water pump (not shown).

Accordingly, the coolant having passed through the electrical component may be supplied to the second heat-exchanger 14 along the first line 2.

Respective components in the air conditioner unit operate for heating the vehicle interior. Accordingly, the refrigerant is circulated along the refrigerant line 11.

A portion of the refrigerant line 11 connecting the first heat-exchanger 13 and the second heat-exchanger 14 is closed by the operation of the first control apparatus 30.

The first connection line 21 is closed by the operation of the second control apparatus 40. The second connection line 31 is opened by the operation of the first control apparatus 30.

Simultaneously, a portion of the refrigerant line 11 connecting the fourth heat-exchanger 16 and the third control apparatus 50 is closed by the operation of the third control apparatus 50. In addition, the third connection line 51 may be opened by the operation of the third control apparatus 50.

The refrigerant discharged from the first heat-exchanger 13 may be introduced into the fourth heat-exchanger 16 along the second connection line 31 opened by the operation of the first control apparatus 30 and the opened portion of the refrigerant line 11.

Accordingly, the first heat-exchanger 13 and the fourth heat-exchanger 16 may cool the refrigerant by using the air introduced into the HVAC module 12.

The opening/closing door (not shown) may be opened such that the air having passed through the fourth heat-exchanger 16 may be introduced into the first heat-exchanger 13.

The refrigerant having passed through the fourth heat-exchanger 16 is introduced into the second control apparatus 40 along the refrigerant line 11.

In the present embodiment, the fourth connection line 61 is opened by the operation of the fourth control apparatus 60. The fifth connection line 71 may be opened by the operation of the fifth control apparatus 70.

In addition, a portion of the refrigerant line 11 connecting the third heat-exchanger 15 and the fifth control apparatus 70 may be closed by the operation of the fifth control apparatus 70.

The second control apparatus 40 may expand the refrigerant introduced from the fourth heat-exchanger 16 and may flow the expanded refrigerant to the refrigerant line 11.

In other words, some, i.e., a portion of the refrigerant among the refrigerant introduced from the second control apparatus 40 into the refrigerant line 11 may flow into the second heat-exchanger 14 through the fifth connection line 71.

Accordingly, the second heat-exchanger 14 may evaporate the expanded refrigerant through heat-exchange with the coolant supplied through the first line 2. The second heat-exchanger 14 may recollect the waste heat of the electrical component 2 from the heated coolant by recollecting the waste heat from the electrical component 3.

Simultaneously, a remaining portion of the refrigerant among the refrigerant introduced from the second control apparatus 40 into the refrigerant line 11 may be introduced into the third heat-exchanger 15 along the refrigerant line 11.

The third heat-exchanger 15 may recollect the ambient air heat while evaporating the expanded refrigerant through heat-exchange with the air.

In addition, the refrigerant having passed through the third heat-exchanger 15 may flow along the opened fourth connection line 61.

The refrigerant discharged from the second heat-exchanger 14 and the third heat-exchanger 15 may flow along the opened third connection line 51 and the refrigerant line 11 connecting the third control apparatus 50 and the compressor 10 and may be supplied to the compressor 10 by passing through and the accumulator 17.

The first heat-exchanger 13 and the fourth heat-exchanger 16 may cool the refrigerant by heat-exchanging the air introduced into the HVAC module 12 with the refrigerant. The refrigerant primarily cooled at the first heat-exchanger may be further cooled at the fourth heat-exchanger 16.

In other words, when the refrigerant having passed through the first heat-exchanger 13 is supplied to the fourth heat-exchanger 16 by the operation of the first control apparatus 30, the fourth heat-exchanger 16 may cool the refrigerant by heat-exchanging the air introduced into the HVAC module 12 with the refrigerant.

The refrigerant having passed through the fourth heat-exchanger 16 is introduced into the second control apparatus 40 along the refrigerant line 11. The second control apparatus 40 may expand the refrigerant and supply the expanded refrigerant to the second heat-exchanger 14 and the third heat-exchanger 15, respectively.

The refrigerant discharged from the second control apparatus 40 may be branched through the fifth connection line 71 and supplied to the second heat-exchanger 14 and the third heat-exchanger 15, respectively.

Accordingly, the second heat-exchanger 14 may cool the supplied refrigerant through heat-exchange with the coolant, and, at the same time, the third heat-exchanger 15 may cool the supplied refrigerant through heat-exchange with the air.

While repeatedly performing such an operation, the second heat-exchanger 14 and the third heat-exchanger 15 may recollect the waste heat of the electrical component 3 and the ambient air heat.

In other words, as the recollected waste heat of the electrical component 3 and ambient air heat are used to increase the temperature of the refrigerant, the heat pump system may reduce the power consumption of the compressor 10 and improve the heating efficiency.

The refrigerant discharged from the second heat-exchanger 14 and the third heat-exchanger 15 is supplied to the third control apparatus 50 along the opened third connection line 51.

The refrigerant is supplied to the accumulator 17 from the third control apparatus 50 along the refrigerant line 11. The refrigerant having passed through the accumulator 17 may be supplied to the compressor 10.

In addition, the refrigerant is compressed by the compressor 10 to a high-temperature and pressure state and is introduced back into the first heat-exchanger 13 along the refrigerant line 11.

As described above, the refrigerant supplied to the first heat-exchanger 13 and the fourth heat-exchanger 16 may increase the temperature of the air introduced into the HVAC module 12.

The opening/closing door (not shown) is opened such that the air introduced into the HVAC module 12 and having passed through the fourth heat-exchanger 16 may pass through the first heat-exchanger 13.

Accordingly, the air introduced from the outside may be converted to a high-temperature state while sequentially passing through the fourth heat-exchanger 16 and the first heat-exchanger 13. The heated air flows into the vehicle interior, thereby achieving the heating of the vehicle interior.

Therefore, as described above, when a heat pump system for a vehicle according to an embodiment is applied, since cooling or heating of a vehicle interior is performed by using natural refrigerant, it is possible to respond to environmental regulations and the overall marketability of the vehicle may be improved.

In addition, according to the disclosure, by applying the R744 refrigerant, which is a natural refrigerant using carbon dioxide, cooling and heating performance may be maximized by being operated in a super-critical region. The super-critical region is a state in which the pressure and temperature of the refrigerant are higher than the threshold pressure and temperature, for cooling and heating of the vehicle interior.

In addition, according to the disclosure, the temperature of the battery module 5 is efficiently adjusted by using a single chiller 20 heat-exchanging the coolant and refrigerant depending on the vehicle mode, thereby streamlining and simplifying the system.

In addition, according to an embodiment, by efficiently adjusting the temperature of the battery module 5, the optimal performance of the battery module 5 may be enabled. Furthermore, the overall travel distance of the vehicle may be increased due to the efficient management of the battery module 5.

In addition, in the heating mode of the vehicle interior, according to the disclosure, the expanded refrigerant is branched by the operation of the second control apparatus 40 and supplied to the second and third heat-exchangers 14 and 15. As a result, the flow of the refrigerant may be more easily controlled, the ambient air heat and waste heat of the electrical component 3 may be smoothly recollected, and, at the same time, the chiller 20 for cooling of the battery module 5 may be optimally designed.

In addition, according to an embodiment, it is possible to reduce manufacturing cost and weight through simplification of an entire system, and to improve space utilization.

While this disclosure has been described in connection with what is presently considered to be practical embodiments, it should be understood that the disclosure is not limited to the disclosed embodiments. On the contrary, the disclosure is intended to cover various modifications and equivalent arrangements included within the spirit and scope of the appended claims.

DESCRIPTION OF SYMBOLS

- 2, 4: first and second lines
- 3: electrical component
- 5: battery module
- 10: compressor
- 11: refrigerant line
- 12: HVAC module
- 13, 14, 15, 16: first, second, third, and fourth heat-exchangers
- 17: accumulator
- 20: chiller
- 21: first connection line
- 30: first control apparatus
- 31: second connection line
- 40: second control apparatus
- 50: third control apparatus
- 51: third connection line
- 60: fourth control apparatus
- 61: fourth connection line
- 70: fifth control apparatus
- 71: fifth connection line

What is claimed is:

1. A heat pump system for a vehicle, comprising:
   an air conditioner unit including a compressor, a first heat-exchanger, a second heat-exchanger, a third heat-exchanger, and a fourth heat-exchanger that are connected through a refrigerant line so as to circulate a refrigerant through the refrigerant line; and
   a chiller configured to exchange heat between the refrigerant supplied from the air conditioner unit with a coolant to adjust a temperature of the coolant,
   wherein the air conditioner unit further includes
      a first control apparatus provided in the refrigerant line between the first heat-exchanger and the second heat-exchanger and configured to selectively supply the refrigerant having passed through the first heat-exchanger to the second heat-exchanger or the fourth heat-exchanger,
      a second control apparatus provided in the refrigerant line between the third heat-exchanger and the fourth heat-exchanger, and configured to selectively expand the refrigerant,
      a first connection line having a first end connected to the second control apparatus and a second end connected to the refrigerant line between the fourth heat-exchanger and the compressor, and provided with the chiller,
      a second connection line having a first end connected to the first control apparatus, and a second end connected to the refrigerant line between the fourth heat-exchanger and the compressor,
      a third control apparatus provided in the refrigerant line between the fourth heat-exchanger and the compressor, and
      a third connection line having a first end connected to the third control apparatus, and a second end connected to the refrigerant line between the first control apparatus and the second heat-exchanger.

2. The heat pump system of claim 1, wherein the first control apparatus comprises:
   a first valve provided in the refrigerant line between the first heat-exchanger and the second heat-exchanger, and
   a second valve provided in the second connection line.

3. The heat pump system of claim 2, wherein the first valve and the second valve are 2-way valves.

4. The heat pump system of claim 1, wherein the first control apparatus comprises a single first control valve provided in a portion where the refrigerant line and the second connection line are connected, between the first heat-exchanger and the second heat-exchanger.

5. The heat pump system of claim 1, wherein the second control apparatus comprises:
   a first expansion valve provided in the refrigerant line, upstream of the fourth heat-exchanger; and
   a second expansion valve provided in the first connection line, upstream of the chiller.

6. The heat pump system of claim 1, wherein the third control apparatus comprises:
   a third valve provided in the refrigerant line between the fourth heat-exchanger and the compressor; and
   a fourth valve provided in the third connection line.

7. The heat pump system of claim 1, wherein the third control apparatus comprises:
   a single second control valve provided in a portion where the refrigerant line and the third connection line are connected, between the fourth heat-exchanger and the compressor.

8. The heat pump system of claim 1, wherein the air conditioner unit further comprises:
a fourth connection line having a first end connected to the refrigerant line between the first control apparatus and the second heat-exchanger and a second end connected to the refrigerant line between the second heat-exchanger and the third heat-exchanger;
a fourth control apparatus provided in the fourth connection line and configured to selectively open and close the fourth connection line;
a fifth control apparatus provided in the refrigerant line between the second heat-exchanger and the third heat-exchanger; and
a fifth connection line having a first end connected to the fifth control apparatus, and a second end connected to the refrigerant line between the third heat-exchanger and the fourth heat-exchanger.

9. The heat pump system of claim 8, wherein the fourth control apparatus is a 2-way valve.

10. The heat pump system of claim 8, wherein the fifth control apparatus comprises:
a fifth valve provided in the refrigerant line between the second heat-exchanger and the third heat-exchanger; and
a sixth valve provided in the fifth connection line.

11. The heat pump system of claim 8, wherein the fifth control apparatus comprises:
a single third control valve provided in a portion where the refrigerant line and the fifth connection line are connected, between the second heat-exchanger and the third heat-exchanger.

12. The heat pump system of claim 8, wherein, in a cooling mode of the vehicle interior:
the refrigerant line connecting the first heat-exchanger and the second heat-exchanger is opened by an operation of the first control apparatus;
the refrigerant line connecting the second heat-exchanger and the third heat-exchanger is opened by an operation of the fifth control apparatus;
the refrigerant line connecting the fourth heat-exchanger and the compressor is opened by an operation of the third control apparatus;
the second connection line is closed by the operation of the first control apparatus;
the third connection line is closed by the operation of the third control apparatus;
the fourth connection line is closed by an operation of the fourth control apparatus; and
the fifth connection line is closed by the operation of the fifth control apparatus.

13. The heat pump system of claim 12, wherein, in the cooling mode of the vehicle interior, when cooling of a battery module is required, the first connection line is opened by an operation of the second control apparatus.

14. The heat pump system of claim 13, wherein the second control apparatus is configured to expand the refrigerant introduced into the first connection line and flow the expanded refrigerant to the chiller such that the battery module is cooled by using the coolant having exchanged heat with the refrigerant in the chiller.

15. The heat pump system of claim 12, wherein the second control apparatus is configured to expand the refrigerant introduced into the fourth heat-exchanger such that the expanded refrigerant is introduced into the fourth heat-exchanger.

16. The heat pump system of claim 8, wherein, in a heating mode of the vehicle interior:
a portion of the refrigerant line connecting the first heat-exchanger and the second heat-exchanger is closed by an operation of the first control apparatus;
the first connection line is closed by an operation of the second control apparatus;
the second connection line is opened by the operation of the first control apparatus;
a portion of the refrigerant line connecting the fourth heat-exchanger and the third control apparatus is closed by an operation of the third control apparatus;
the third connection line is opened by the operation of the third control apparatus;
the fourth connection line is opened by an operation of the fourth control apparatus;
the fifth connection line is opened by an operation of the fifth control apparatus; and
a portion of the refrigerant line connecting the third heat-exchanger and the fifth control apparatus is closed by the operation of the fifth control apparatus.

17. The heat pump system of claim 16, wherein the second control apparatus is configured to expand the refrigerant introduced from the fourth heat-exchanger and flow the expanded refrigerant to the refrigerant line.

18. The heat pump system of claim 16, wherein:
a portion of the refrigerant among the refrigerant introduced from the second control apparatus into the refrigerant line is introduced into the second heat-exchanger through the fifth connection line;
a remaining portion of the refrigerant among the refrigerant introduced from the second control apparatus into the refrigerant line is introduced into the third heat-exchanger along the refrigerant line; and
the refrigerant having passed through the third heat-exchanger flows along the opened fourth connection line.

19. The heat pump system of claim 16, wherein the refrigerant discharged from the second heat-exchanger and the third heat-exchanger is supplied to the compressor along the opened third connection line and the refrigerant line connecting the third control apparatus and the compressor.

20. The heat pump system of claim 1, wherein the second heat-exchanger, the third heat-exchanger, and the fourth heat-exchanger are configured to cool or evaporate the refrigerant according to a selective operation of the second control apparatus.

21. The heat pump system of claim 1, wherein the refrigerant is R744 refrigerant formed of carbon dioxide.

22. The heat pump system of claim 1, wherein:
an accumulator is provided in the refrigerant line between the fourth heat-exchanger and the compressor;
the first heat-exchanger, the third heat-exchanger, and the fourth heat-exchanger are air-cooled gas coolers configured to exchange heat between the refrigerant with air; and
the second heat-exchanger and the chiller are water-cooled gas coolers configured to exchange heat between the refrigerant with the coolant.

23. The heat pump system of claim 1, wherein:
the second heat-exchanger is connected to an electrical component through a first line through which the coolant circulates; and
the chiller is connected to a battery module through a second line through which the coolant circulates.

* * * * *